Aug. 12, 1924.
G. L. TRUEBLOOD
1,504,657
SLIDE MOVING APPARATUS
Filed Feb. 8, 1919
3 Sheets-Sheet 1
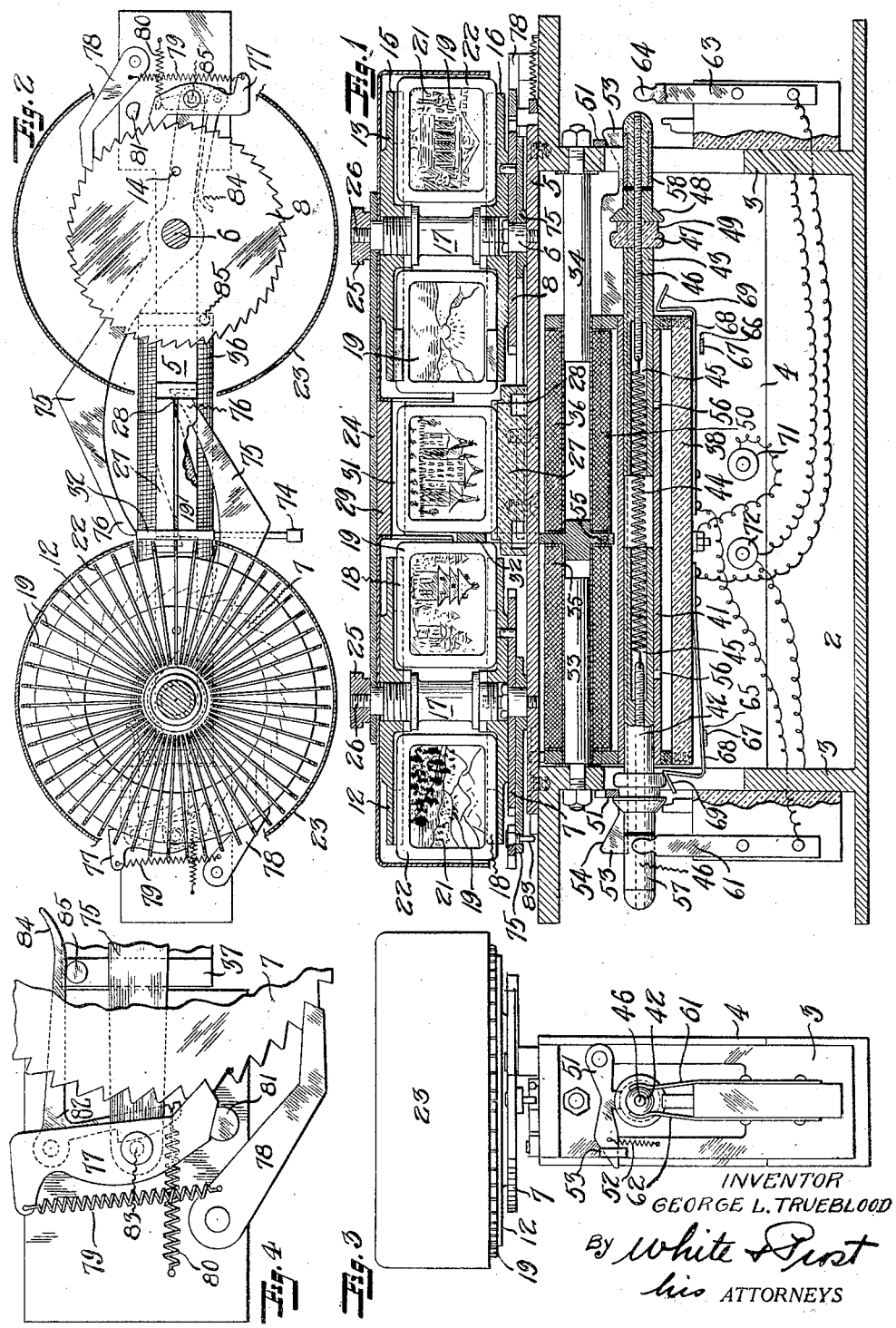
INVENTOR
GEORGE L. TRUEBLOOD
By White & Prost
his ATTORNEYS Aug. 12, 1924.  1,504,657
G. L. TRUEBLOOD
SLIDE MOVING APPARATUS
Filed Feb. 8, 1919  3 Sheets-Sheet 2
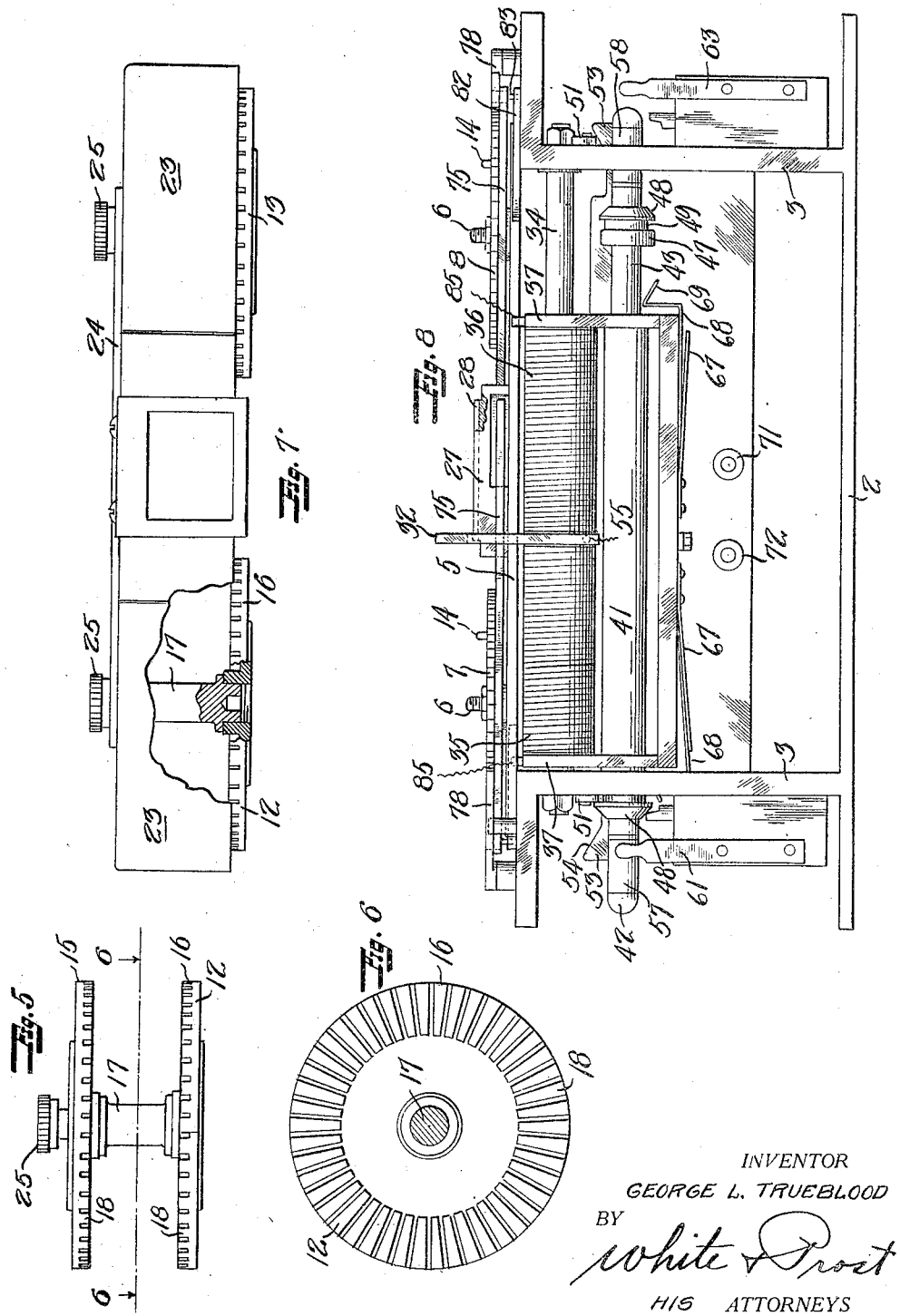
INVENTOR
GEORGE L. TRUEBLOOD
BY
White & Frost
HIS ATTORNEYS

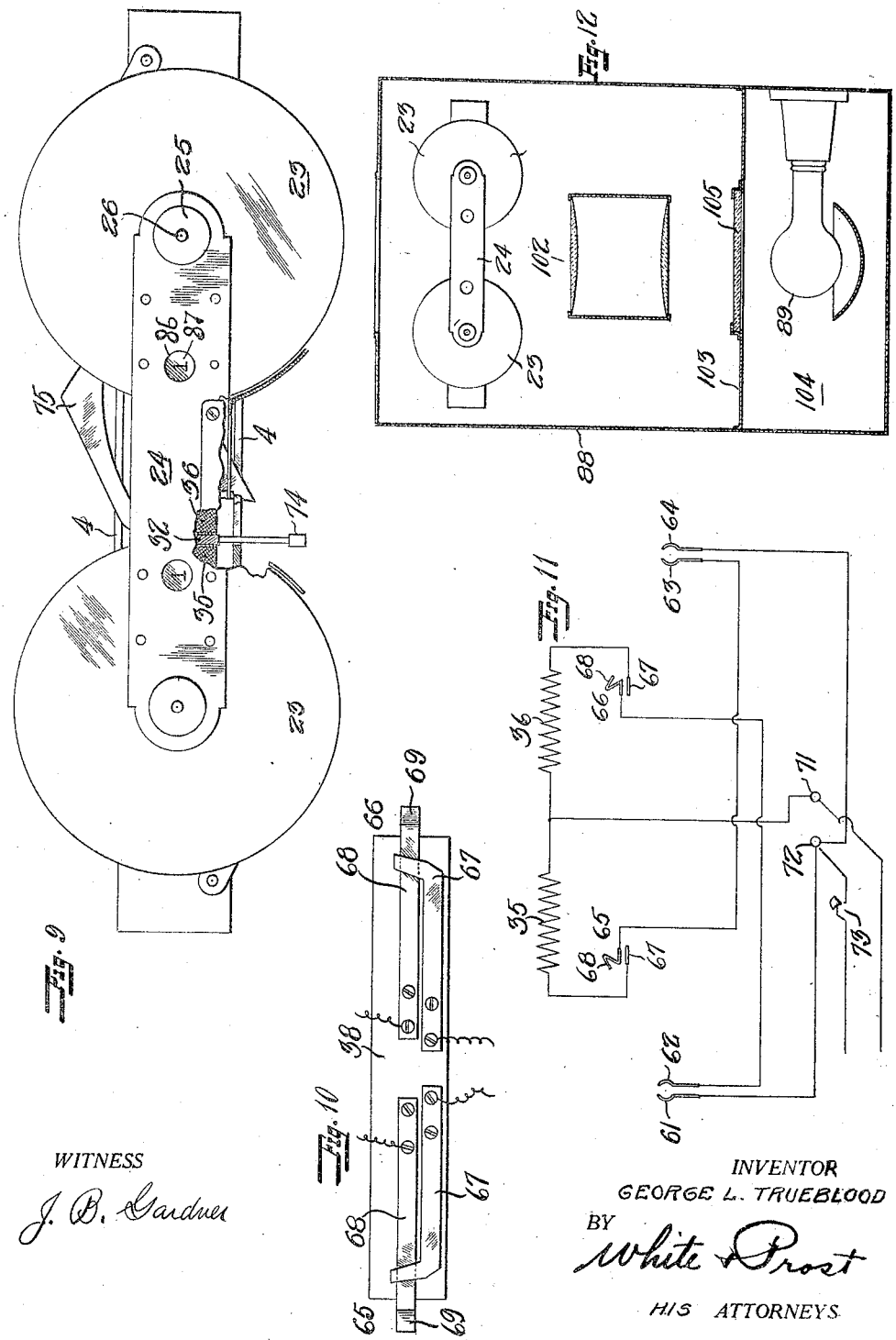

Patented Aug. 12, 1924.

1,504,657

UNITED STATES PATENT OFFICE.

GEORGE L. TRUEBLOOD, OF BERKELEY, CALIFORNIA.

SLIDE-MOVING APPARATUS.

Application filed February 8, 1919. Serial No. 275,829.

*To all whom it may concern:*

Be it known that I, GEORGE L. TRUEBLOOD, a citizen of the United States, and a resident of Berkeley, county of Alameda, and State of California, have invented a certain new and useful Slide-Moving Apparatus, of which the following is a specification.

The invention relates to an apparatus for moving transparent slides containing pictures, advertisements or other matter into and out of the field of exposure in a projection apparatus, or other device.

An object of the invention is to provide an automatic apparatus for successively moving a series of slides into the field of exposure.

Another object of the invention is to provide means for automatically timing the duration of exposure of the slide.

Another object of the invention is to provide a slide containing magazine which may be readily placed on or removed from the actuating apparatus.

A further object of the invention is to produce a novel form of slide.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific form of my generic invention, but it is to be understood that I do not limit myself to such form, since the invention, as expressed in the claims, may be embodied in a plurality of forms.

In the drawings I have shown the invention embodied in a machine for moving slides into and out of the field of exposure, but it is to be understood that the invention may be embodied in other machines. The apparatus consists of a pair of circular magazines arranged in opposed relation with respect to the field of exposure and mechanism for moving a slide from one magazine into the field of exposure and simultaneously moving another slide from the field of exposure to the other magazine. The slide is returned to the magazine from which it is withdrawn and the magazine is rotated one step to bring the successive slide into position to be withdrawn on the next operation of the moving means. The two magazines are connected together and may be readily removed from the apparatus, so that the nature of the slides being exposed may be readily changed by substituting another magazine structure containing different slides. In educational institutions which employ thousands of slides, the slides for any given lecture or demonstration are permanently arranged in proper sequence in the magazines and when a lecture is to be given the proper magazine structure is chosen and placed on the apparatus. The apparatus is also so constructed that the period of exposure of the slides is automatically timed, although the time of exposure may be increased to any desired period.

In the accompanying drawings:

Figure 1 is a vertical longitudinal section of the apparatus.

Figure 2 is a top view of the apparatus with one magazine removed and the other shown in section.

Figure 3 is an end elevation of the apparatus.

Figure 4 is a detail on a larger scale of the magazine rotating mechanism.

Figure 5 is a side elevation of one magazine.

Figure 6 is a section taken on the line 6—6, Figure 5.

Figure 7 is a front view of a magazine structure or unit, part of the casing being broken away to disclose the magazine.

Figure 8 is a side elevation of the apparatus with the magazine unit and a side plate removed.

Figure 9 is a top view of the apparatus, part thereof being broken away to disclose means for manually operating the slide moving mechanism.

Figure 10 is an underneath view of a portion of the reciprocating mechanism, showing switches for controlling the flow of the actuating current.

Figure 11 is diagrammatic representation of the electric circuits of the apparatus.

Figure 12 is a plan view of the apparatus in its environments.

The apparatus consists of a suitable frame comprising the base plate 2, the end plates 3, side plates 4 and the top plate 5. Journaled on posts 6, secured to the top plate 5, are the magazine-advancing ratchet wheels 7 and 8, which are alternately advanced in a step-by-step movement. The magazines 12—13 are rotatably secured to the ratchet wheels, so that they rotate therewith, by pins 14 on the ratchet wheels, which seat in holes in the magazines. The ratchet wheels and the magazines lie preferably in a horizontal plane and by virtue of the pin connection between the two, the magazines may be removed from the apparatus by merely lifting them off.

Each magazine consists of two circular plates 15—16 secured together by a central post 17. The plates 15—16 are provided on their adjacent surfaces with raised marginal or annular portions 18 and these portions are provided with a plurality of regularly spaced radial slots into which the slides 19 are inserted and by which they are held in a vertical plane. The slides 19 consist of the transparent or translucent portion 21 containing the matter to be projected and an enclosing border or frame 22 of metal, preferably iron or steel, for reasons which will be set forth hereinafter. The transparent portion of the slide is preferably formed of film, but thin glass may be used, when desired. Each magazine is enclosed in a housing 23 which is provided with a slot through which the slides move into and out of the magazine. The two housings are connected together by the plate 24 and each magazine is secured to and rotatably disposed within the housing by the nut 25 engaging the projecting spindle 26 of the magazine. This spindle is provided with a left-hand thread for reasons which will appear hereinafter. Since the magazines are attached to the housings and the housings are secured together, the two magazines and housings form a unit, which may be readily lifted from or placed on to the actuating mechanism. A plurality of magazine units may be provided with each actuating mechanism and the respective units charged with slides on different subjects so that the apparatus may be changed instantly from projecting slides of one subject to slides of a different subject. This renders the machine particularly adaptable to school-room use, where lessons or lectures on different subjects are given in proximate succession.

The two magazines are spaced apart from each other, providing an exposure area between them, into which the slides are successively moved from the magazines. The exposure area is of sufficient size to accommodate a slide and the projecting light beam passes through the exposure area. Secured to the underside of the plate 24 and disposed between the two housings 23 is a block 29 having a slot or groove 31 therein which is alined with the slots in the housings, forming a guide and support for the slides, in the exposure area. Secured to the top plate 5 of the frame and disposed between the magazines is a guide block 27 having a slot 28 therein alined with the slots in the housings. The slides are, therefore, guided and supported by the blocks 27 and 29 during the time that they are in the exposure area. The housings 23 are somewhat greater in diameter than the magazines and the slides project slightly from the peripheries of the magazines, so that they may be more readily extracted therefrom. The guide block 27 is cut down on the ends and extends under the projecting portions of the slides in the magazines.

Means are provided for extracting a slide from a magazine and moving it into the exposure area, and for subsequently returning it to the slots in the magazine from which it was withdrawn. Simultaneously with the movement of a slide from the exposure area into one magazine, another slide is moved from the other magazine into the exposure area, so that when both magazines have been fully charged there is always a slide in the exposure area. The slides are moved by a reciprocating actuator which in the present embodiment consists of a pole piece 32 arranged to be reciprocated across the exposure area between the magazines. In the present construction the pole piece is formed in the shape of a yoke straddling the top plate 5 and the block 27. The top plate and the other members of the frame and other portions of the mechanism are made of brass or other non-magnetic material, so that they will not interfere with the magnetizing of the pole piece, which is preferably made of soft iron. The frames of the slides are made of steel or other magnetic material and the pole-piece or actuator is movable from contact or approximate contact with a slide in one magazine to a similar position with regard to the alined slide in the other magazine. When the pole-piece is magnetized, the magnetism causes the slide to adhere thereto and consequently be drawn from the magazine by the moving pole-piece.

In the present construction the pole-piece is energized by an electric current, which also operates to cause reciprocation of the actuator. Secured to the end plates 3 of the frame are two alined solenoid cores 33—34 which are spaced apart at their adjacent ends. Mounted on the cores 33—34 and slidable longitudinally thereon are two solenoids 35—36 which are suitably mechanically connected together so that they reciprocate simultaneously. The pole-piece 32 is arranged between the adjacent poles of the two solenoids, so that when either solenoid is energized, the pole-piece is magnetized. The energizing of solenoid 35 causes both solenoids to move to the left and the energizing of solenoid 36 causes both solenoids to move to the right. The solenoids are mechanically connected together by the end strips 37 and the bar 38 of insulating material, the structure thus formed comprising a reciprocating frame.

Means are provided for alternately energizing the respective solenoids to produce a reciprocating movement of the frame. The electric circuit of each solenoid is provided with two circuit-making and breaking points and the contacts at both of these points must be closed before the solenoid is energized. One of these contacts is closed when the reciprocating frame moves, and the other is closed at a predetermined later time, and in the interval, a slide is exposed. The apparatus, therefore, operates also to automatically time the exposure of the slides and when once set in operation, will operate automatically for an indefinite time to expose the slides successively. The time of exposure of each slide may be controlled at will, however, as will be hereinafter set forth. When desired, the timing mechanism may be omitted, but it is preferably included.

Secured to the reciprocating frame is a hollow cylinder 41, preferably made of steel, having its inner surface polished. Arranged within the cylinder and extending from the ends thereof, are two plungers 42—43, preferably made of bronze and having their surfaces polished. The diameter of a plunger is slightly less than the internal diameter of the cylinder, so that it has a rather snug sliding fit therein, the fit being such that any air leakage around the plunger occurs slowly. The plungers are secured together at their inner ends by a spring 44, which extends into recesses 45 in the ends of the plungers and is connected to the screws 46, so that the tension on the spring may be adjusted as desired. The spring tends to draw the plungers together and when one plunger has been drawn out, it causes that plunger to return, the return movement being slow on account of the close fit of the plunger in the cylinder. The cylinder, which is secured to the reciprocating frame, is consequently reciprocated, and means are provided for holding one plunger stationary during the movement of the frame and releasing the plunger as the frame reaches the end of its movement. The released plunger then moves slowly into the cylinder and after it has moved a predetermined distance, operates to close a contact in the electric circuit which results in the energizing of a solenoid and a movement of the frame in the opposite direction.

Secured to each plunger at that part which does not enter the cylinder, is a bobbin or ferrule 47, preferably formed of insulating material. Adjacent the ferrule, the plunger is provided with a conical shoulder 48, forming with the ferrule, an annular groove 49. Pivoted to each end plate 3 is a latch 51 which is adapted to seat in the groove on the plunger and hold it against longitudinal movement. The latch is held down by a spring 52 and means are provided for raising the latch to release the plunger when the reciprocating frame has moved a predetermined distance. Supported in the end plates 3 is a slide bar 53 having inclined ends 54 disposed under the latches. When the bar is moved to the right, the latch 51 at the left is raised, releasing the left plunger 42 and when the bar is moved to the left, the plunger 43 is released. The bar 53 is moved by the reciprocating frame to which is secured a pin 55 engaging in a longitudinal slot 50 in the bar. As the reciprocating frame approaches the end of its throw the pin moves the slide bar, causing the release of the detained plunger.

As the reciprocating frame is moved in either direction during the operation of the apparatus, one plunger or the other is held stationary, causing an elongation of the connecting spring 44 and the production of a partial vacuum within the cylinder. This does not materially retard the movement of the reciprocating frame, but opposes a force to its movement which causes it to move smoothly and to accomplish the sure movement of the slide to proper position in the exposure area. Immediately before the detained plunger is released, the vaccuum within the cylinder is destroyed, by the movement of the port 56 in the cylinder, beyond the inner end of the plunger. The cylinder is provided with two such ports 56, one of which is uncovered by each plunger. When the plunger is released, the condition of vacuum is no longer existent, and the plunger is drawn into the cylinder slowly by the spring 44.

The outer ends of the plungers are provided with elongated contacts 57—58 which lie between and engage the contact fingers 61—62 and 63—64 respectively, in the electric circuit, the contacts 61—62 being engagable by the contact 57 and the contacts 63—64 being engageable by the contact 58. When the reciprocating frame is moved to the left, the contact 57 closes the circuit between the fingers 61—62 and contact 58 moves from between the fingers 63—64. Similarly when the frame is moved to the right, the contact 58 closes the circuit between the fingers 63—64 and contact 57 moves from between the fingers 61—62. The contacts 57 and 58 are elongated, so that the existent electric circuit will be maintained for a short period of time after the plunger is released. The plunger is released at or at approximately the instant that the reciprocating frame reaches its extreme position and the circuit is maintained for a brief time thereafter, due to the elongated contact. This serves to keep the pole-piece magnetized for a short time after it has reached the end of its stroke, thereby holding the slide fixed in the exposure area. The pole-piece moves from side to side with great rapidity and if the circuit was opened as it reached the end of its throw, the transparent slide would be released and would rebound, throwing it out of proper position. By maintaining the current for a brief time, however, the slide is brought positively to rest before it is released from magnetic adherence to the pole-piece.

The contacts 61—62 are in the circuit of solenoid 36 and contacts 63—64 are in the circuit of solenoid 35, so that when the reciprocating frame is at the left, solenoid 36 only may be energized and when the reciprocating frame is at the right, solenoid 35 only may be energized. Arranged in each circuit is a second switch which is opened and closed by the movement of the plunger with respect to the reciprocating frame. The switch 65 is in the circuit of solenoid 35 and switch 66 is in the circuit of solenoid 36, and switch 65 is operated by the plunger 42 and switch 66 is operated by plunger 43. The switches 65 and 66 are arranged on the bar 38 of the reciprocating frame and each switch comprises a fixed contact 67 and a flexible or resilient contact arm 68 disposed above the fixed contact. The arm 68 is provided on its end with an inclined ear 69 which lies in the path of the ferrule 47 on the plunger, so that as the plunger approaches its inward position with respect to the cylinder, the arm 68 is pressed down into contact with contact 67, closing the circuit through one of the solenoids, causing a movement of the reciprocating frame. The plunger 43 approaching its inward position closes switch 66, thereby closing the circuit through solenoid 36 and causing a movement of the reciprocating frame to the right. This opens switch 65 and closes the circuit between contacts 63—64, but the circuit through solenoid 35 is not made until the slowly inwardly moving plunger 42 closes switch 65. In this manner the reciprocating frame is caused to move rapidly in opposite directions with periods of rest between the movements. The adjacent ends of the solenoid windings are connected to a binding post 71 and the other ends of the windings are connected to the binding post 72 through the switches in the circuits. When it is desirable to manually control the time of exposure of the slides, a switch 73 may be arranged in the current leads, and the frame will not be reciprocated until the switch 73 is closed. When the device is to operate automatically the switch 73 is eliminated or maintained in closed position.

In some instances it may be desirable to reciprocate the frame manually and to permit this, the frame is provided with a pin or handle 74, extending through a slot in the stationary frame, so that it may be readily reached.

Means are provided for alternately advancing the magazines in a step-by-step movement as the slides are being exposed, so that a different slide will be moved into the exposure area at each movement of the reciprocating frame. As has been pointed out before, the magazines are connected to ratchet wheels 7 and 8, so that they rotate therewith, and means are provided for advancing the ratchet wheels a circular distance equal to the circumferential spacing of the slides in the magazines. The magazine is advanced one step after the slide just exposed has been returned thereto, so that on the next movement of the reciprocating frame, the next slide in the magazine is exposed.

The angular pitch of the teeth on the ratchet wheels is equal to the angular spacing of the slides in the magazine and the ratchet wheel is advanced one tooth for each reciprocation of the moving frame. Fulcrumed on each ratchet wheel journal is a lever 75, having a cam end 76 lying in the path of the pole-piece 32 so that as the pole-piece is moved, the lever is moved about its fulcrum. Pivoted to the other end of the lever 75 is a spring-pressed latch 77 engaging the ratchet teeth. The ratchet wheel is prevented from moving in the wrong direction by a spring-pressed detent 78 engaging the ratchet teeth. As the pole-piece 32 moves to the right, the lever 75 associated with ratchet wheel 7 is moved to draw the latch 77 back one tooth without moving the magazine. When the pole-piece moves to the left, the exposed slide is moved into the slots in magazine 12 from which it was previously withdrawn, and the lever 75 is held against movement until the slide has been completely inserted into the magazine. Then the lever is released and the spring 79 secured to the latch 77 advances the ratchet wheel one tooth. The wheel is prevented from moving further than one tooth by the stop 81 against which the latch 77 strikes and which holds the latch firmly in engagement with the tooth.

The lever 75 is held against movement during the principal portion of the movement of the pole-piece, by a latch 82 pivoted to the main frame and engaging a pin 83 on the lever. The latch 82 is provided with a cam arm 84 which lies in the path of a pin 85 on the reciprocating frame. As the frame approaches the end of its movement, the pin engages the arm 84 and moves the latch 82 to disengage the pin 83, thereby permitting the lever to be moved to advance the magazine. The latch 82 is held in operative position by the spring 80 and holds the lever 75 until the slide is seated in the magazine. The same mechanisms for moving and controlling the movement of the magazines are associated with both magazines, so that they are advanced alternately to present the next slide to the pole-piece.

When the pole-piece is at the right, the magazine 12 may be readily rotated in a counter-clockwise direction by the nut 25 which is provided with a left-hand thread so that it will not unscrew while rotating the magazine. Similarly, the magazine 13 may be rotated when the pole-piece is at the left. The handle 74 is used for moving the pole-piece under these conditions. In order that the lecturer or attendant may properly position the magazines so that the slides will be exposed in the proper order, the magazine housings are provided with apertures 86 and the magazines are provided with indicating signs 87 to indicate their proper position at starting.

The device of my invention is arranged in a housing 88 in which is disposed the source of light 89 and the condensing lens 102. The projecting lens is not shown in the drawings. Between the light 89 and the device is a wall 103 of heat insulating material which forms the lamp house 104 and which retards the flow of heat to the device, and consequently to the slides. The wall 103 is provided with an aperture over which is placed one or more sheets of glass 105, preferably window glass, which acts as a heat screen, to remove a portion of the heat rays from the light beam and thereby reduce the temperature of the beam which is thrown on the exposed slide.

I claim:

1. The combination with a movable magazine adapted to contain magnetizable objects, of a pole-piece movable toward and away from said magazine to remove the objects therefrom and means cooperating with the pole piece for moving the magazine.

2. The combination with a movable magazine adapted to contain magnetizable objects, of a pole-piece adapted to be brought into magnetic contact with said objects, means for moving said pole-piece to withdraw the objects from the magazine and means cooperating with the pole piece for moving the magazine.

3. The combination with a movable magazine adapted to contain magnetizable objects, of a pole-piece adapted to be brought into magnetic contact with said objects, means for simultaneously magnetizing said pole-piece and moving it to withdraw the objects from the magazine and means cooperating with the pole piece for moving the magazine.

4. The combination with a movable magazine adapted to contain magnetizable objects, of a pole-piece adapted to be brought into magnetic contact with said objects, and a solenoid for magnetizing the pole-piece and moving it away from the magazine.

5. The combination with a movable magazine adapted to contain a plurality of magnetizable objects, of a pole-piece adapted to be brought into magnetic contact with one of said objects, means for moving the pole-piece to withdraw the object from the magazine, and means for moving the pole-piece to replace the object in the magazine.

6. The combination with a movable magazine adapted to contain a plurality of magnetizable objects, of a pole-piece adapted to be brought into magnetic contact with one of said objects, means for moving the pole-piece to withdraw the object from the magazine, means for moving the pole-piece to replace the object in the magazine, and means for moving the magazine to bring another object into magnetic contact with the pole-piece.

7. The combination with a pair of spaced, movable magazines adapted to contain slides of low magnetic reluctance and disposed on opposite sides of an exposure area, of a pole-piece arranged between said magazines and adapted to be moved to withdraw slides alternately from said magazines.

8. The combination with a pair of movable slide magazines arranged on opposite sides of an exposure area, of means magnetically engaging the slides for simultaneously moving a slide from one magazine into the exposure area and a slide from the exposure area into the other magazine.

9. The combination with a pair of movable slide magazines arranged on opposite sides of an exposure area, of a reciprocating frame arranged between said magazines, a pole-piece on said frame and solenoids on said frame arranged to magnetize said pole piece.

10. The combination with a pair of movable slide magazines arranged on opposite sides of an exposure area, of a reciprocating frame arranged between said magazines and adapted to be reciprocated from one magazine to the other, solenoids for moving said frame in opposite directions, circuits for said solenoids, means for closing a solenoid circuit, and means carried by the frame and operative by a movement thereof for opening the closed circuit.

11. The combination with a magazine adapted to contain a slide of low magnetic reluctance, of a reciprocating frame associated with said magazine, a pole-piece on said frame arranged for magnetic contact with said slide, a solenoid for energizing said pole-piece, a circuit for said solenoid, and means for opening said circuit after the frame has completed its movement.

12. The combination with a magazine adapted to contain a slide of low magnetic reluctance, of a reciprocating frame associated with said magazine, a solenoid for moving said frame away from said magazine, a pole-piece on said frame energized by said solenoid and adapted to contact magnetically with said slide, a circuit for said solenoid, and means operative by the movement of the frame for opening said circuit after the frame has completed its movement.

13. The combination with pair of movable slide magazines arranged on opposite sides of an exposure area, of a reciprocating frame arranged between said magazines and arranged to move slides from the magazines to the exposure area and vice versa, solenoids for moving the frame in opposite directions, circuits for said solenoids, means carried by the frame for alternately closing said solenoid circuits for a brief time, and means carried by the frame for timing the subsequent closing of the open circuit.

14. The combination with a reciprocating frame, of a solenoid for moving the frame in one direction, a second solenoid for moving the frame in the opposite direction, a circuit for each solenoid, two switches in each solenoid circuit, means carried by the frame for opening the switch in the circuit of the energized solenoid after the frame has completed its movement.

15. The combination with a reciprocating frame, of a solenoid for moving the frame in one direction, a second solenoid for moving the frame in the opposite direction, circuits for said solenoids, two switches in each solenoid circuit, means operative by the movement of the frame by one solenoid to open one switch in each circuit, and means carried by the frame for closing the circuit of the other solenoid after a predetermined time.

16. The combination with a reciprocating frame, of a solenoid for moving the frame in one direction, a second solenoid for moving the frame in the opposite direction, circuits for said solenoids, a cylinder on said frame, plungers slidably disposed in said cylinder, and means on said plungers for opening and closing the solenoid circuits.

17. The combination with a reciprocating frame, of a solenoid for moving the frame in one direction, a second solenoid for moving the frame in the opposite direction, circuits for said solenoids, a cylinder on said frame, plungers slidably disposed in said cylinder and projecting from the opposite ends thereof, a spring connecting said plungers, two switches in each solenoid circuit, and means operative by the movement of a plunger for first opening a switch in one circuit and then closing a switch in the other circuit.

18. The combination with a reciprocating frame, of a cylinder carried by said frame, plungers slidably disposed in said cylinder and forming a substantially air-tight joint therewith, and means for holding one of said plungers against movement when the frame is moved.

19. The combination with a reciprocating frame, of a cylinder carried by said frame, plungers slidably disposed in said cylinder and forming a substantially air-tight joint therewith, means for holding one of said plungers against movement as the frame is moved, and means for releasing said holding means as the frame reaches the end of its throw.

20. The combination with a reciprocating frame, of a cylinder carried by said frame, plungers slidably disposed in said cylinder and forming a substantially air-tight joint therewith, a latch for holding one of said plungers against movement as the frame is moved and a slide bar associated with the frame and arranged to release the latch as the frame reaches the end of its throw.

21. The combination with a reciprocating frame, of a cylinder carried by said frame, plungers slidably disposed in said cylinder and forming a substantially air-tight joint therewith, a spring connecting the plungers, a latch for holding one of said plungers against movement as the frame is moved whereby a vacuum is produced in the cylinder, said cylinder being provided with an aperture arranged to be uncovered by the plunger when the frame approaches the end of its throw, and means for releasing the latch as the frame approaches the end of its throw.

22. The combination with a reciprocating frame, of solenoids arranged to reciprocate said frame, a circuit for each solenoid, a cylinder on said frame, plungers arranged in and projecting from said cylinder, contact fingers forming parts of the solenoid circuits arranged in the path of said plungers and elongated contacts on the plungers adapted to engage said contact fingers.

23. In a slide moving apparatus, a removable magazine structure, comprising a pair of spaced rotatable slide magazines, circular housings enclosing said magazines, and means connecting said housings together to form a unitary structure.

24. A new article of manufacture, comprising a pair of rotatable slide magazines adapted to contain a plurality of radially-disposed slides, and connected housings enclosing said magazines.

25. A new article of manufacture, comprising a pair of rotatable slide magazines adapted to contain a plurality of radially disposed slides, connected housings enclosing said magazines and a slide guide arranged between said magazines.

26. The combination with a pair of spaced rotatable slide magazines arranged on opposite sides of an exposure area, of a reciprocating element for moving the slides from the magazines to the exposure area and vice versa, levers disposed adjacent said element arranged to be moved by movement of said element, and means on the levers adapted to engage and rotate said magazines.

27. The combination with a pair of spaced rotatable slide magazines arranged on opposite sides of an exposure area, of a reciprocating element for moving the slides from the magazines to the exposure area and vice versa, levers disposed adjacent said element and arranged so that one lever is moved by a movement of the element in one direction and the other lever moved by a movement of the element in the opposite direction, and means on the levers for engaging and moving the magazines.

28. The combination with a rotatable slide magazine, of a reciprocating element for moving slides from and to the magazine, a lever disposed adjacent said element arranged to be moved outward by a movement of the element from the magazine, a latch for holding the lever in its outward position, a ratchet wheel associated with the magazine, a pawl on the lever engaging said ratchet wheel, and means operative by the completion of the movement of the element toward the magazine for releasing said latch, and a spring for moving the lever back to its inward position and advancing the magazine.

In testimony whereof, I have hereunto set my hand at San Francisco, California, this 30th day of January, 1919.

GEORGE L. TRUEBLOOD.

In presence of—
   H. G. PROST.